United States Patent
Lopes

(10) Patent No.: US 10,021,697 B2
(45) Date of Patent: Jul. 10, 2018

(54) MULTI-TIERED SHARED ACCESS OPERATION

(71) Applicant: QUALCOMM Incorporated, San Diego, CA (US)

(72) Inventor: Luis Fernando Brisson Lopes, Swindon (GB)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 14/609,014

(22) Filed: Jan. 29, 2015

(65) Prior Publication Data

US 2015/0230255 A1    Aug. 13, 2015

Related U.S. Application Data

(60) Provisional application No. 61/937,329, filed on Feb. 7, 2014.

(51) Int. Cl.
*H04W 72/04* (2009.01)
*H04W 16/02* (2009.01)

(52) U.S. Cl.
CPC ....... *H04W 72/0486* (2013.01); *H04W 16/02* (2013.01); *H04W 72/0453* (2013.01); *H04W 72/0493* (2013.01)

(58) Field of Classification Search
CPC . H04W 16/14; H04W 72/0453; H04W 16/02; H04W 16/10; H04W 28/26
See application file for complete search history.

(56) References Cited

U.S. PATENT DOCUMENTS

| | | | |
|---|---|---|---|
| 2009/0191906 A1 | 7/2009 | Abedi | |
| 2011/0080882 A1 | 4/2011 | Shu et al. | |
| 2012/0182887 A1 | 7/2012 | Junell et al. | |
| 2013/0295948 A1* | 11/2013 | Ye | H04W 72/0453 455/452.1 |
| 2015/0373554 A1* | 12/2015 | Freda | H04W 16/14 455/450 |
| 2016/0242031 A1* | 8/2016 | Ojanen | H04W 28/16 |

OTHER PUBLICATIONS

International Search Report and Written Opinion—PCT/US2015/013862—ISA/EPO—dated May 18, 2015.

* cited by examiner

*Primary Examiner* — Jae Y Lee
*Assistant Examiner* — Aixa Guadalupe-Cruz
(74) *Attorney, Agent, or Firm* — Liem T. Do

(57) ABSTRACT

A method for wireless communication includes receiving an indication of unused first tier spectrum resources to determine second tier spectrum resources available for use by a second tier system. The method also includes determining third tier spectrum resources available for use a third tier system based on unused second tier spectrum resources.

28 Claims, 7 Drawing Sheets

FIG. 1
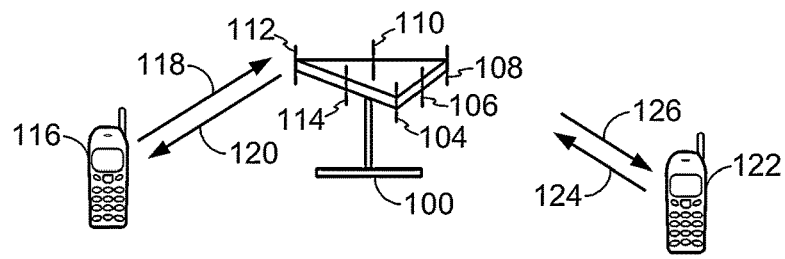
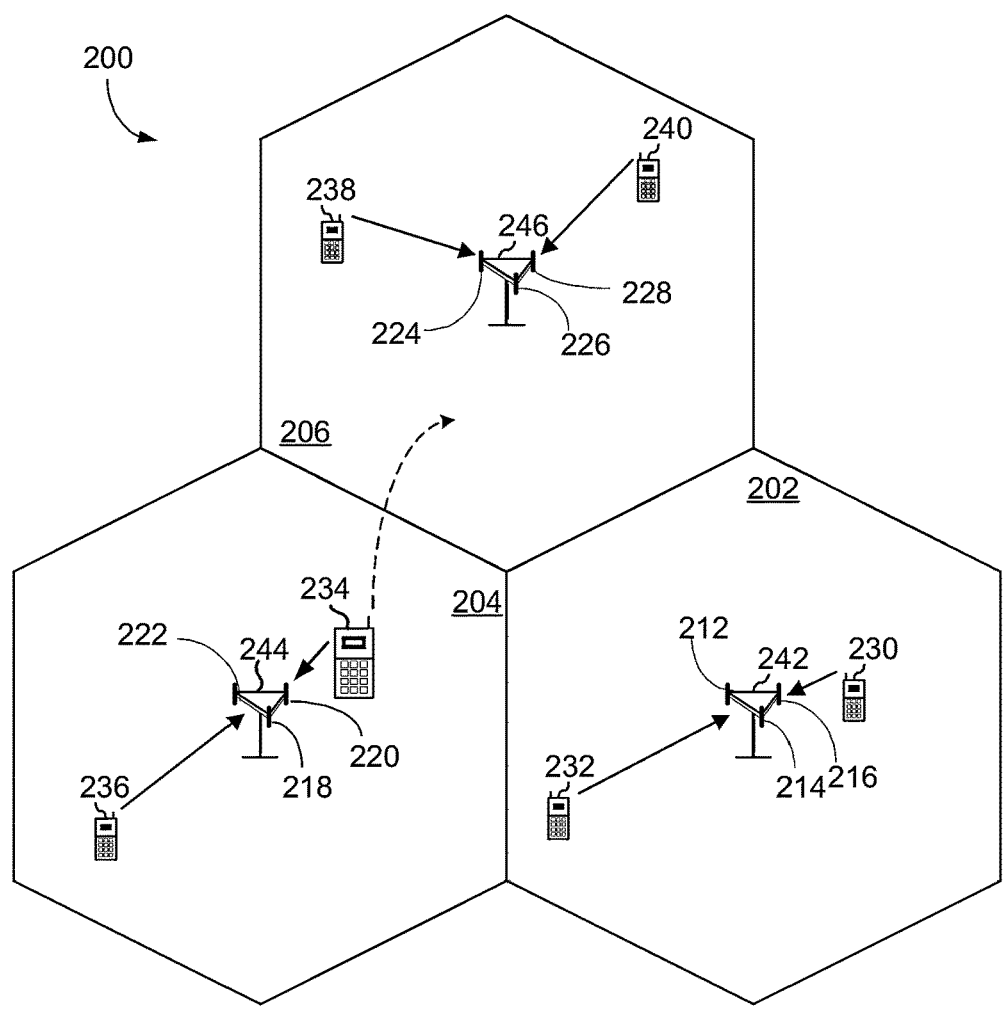
FIG. 2
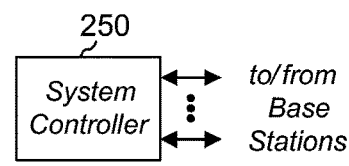

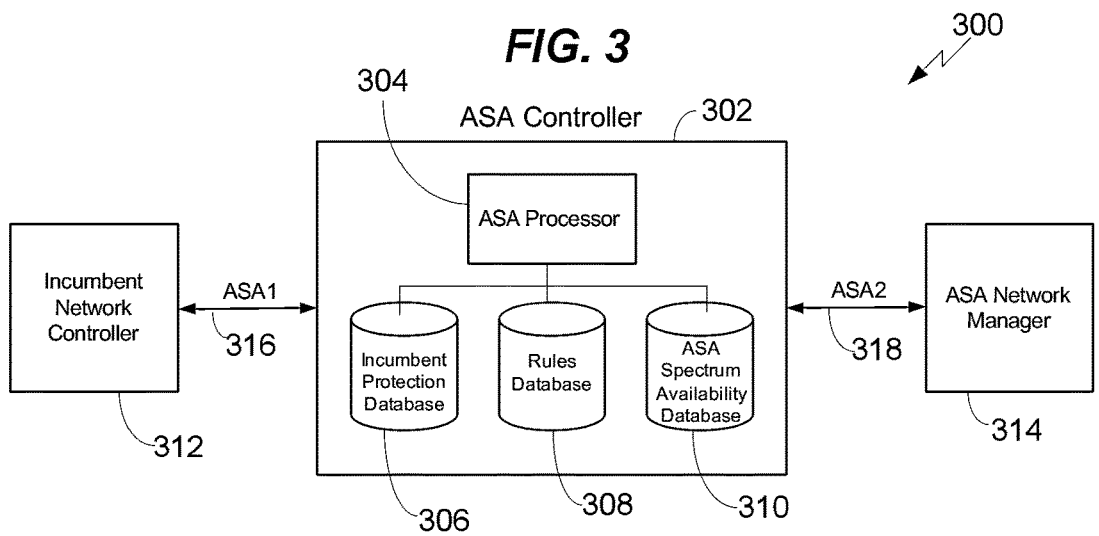
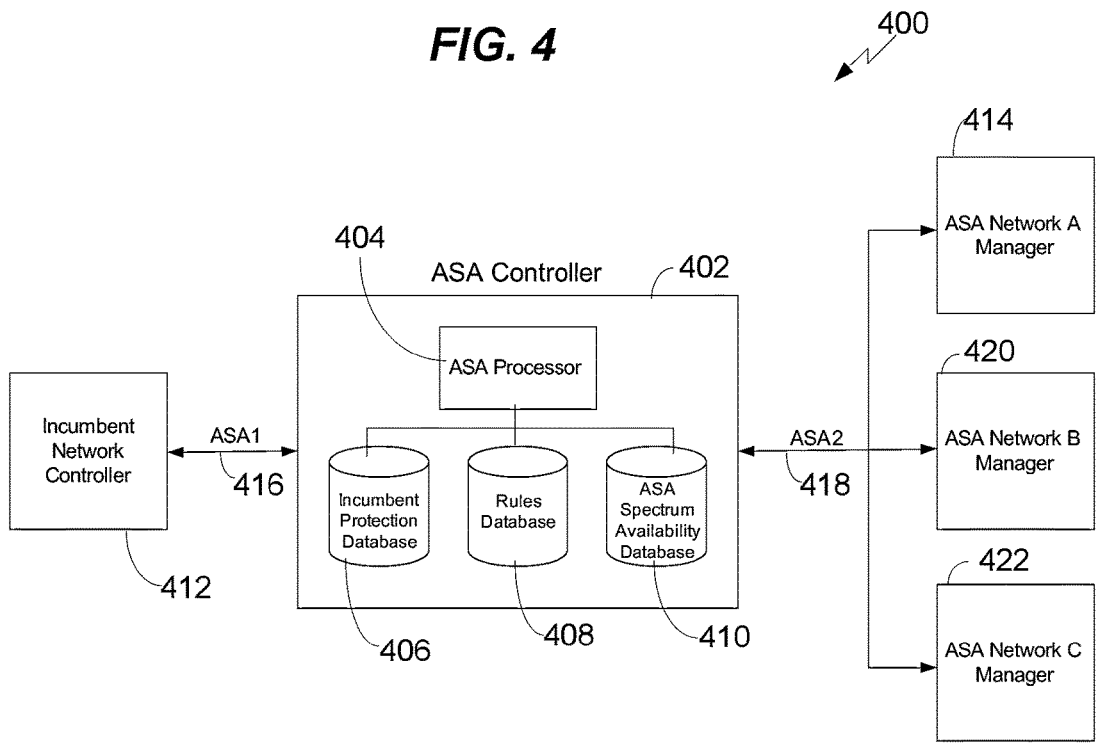

802
RECEIVE, FROM A FIRST SPECTRUM TIER, AN INDICATION OF UNUSED FIRST SPECTRUM TIER RESOURCES TO DETERMINE SECOND SPECTRUM TIER RESOURCES AVAILABLE FOR USE BY ONE OR MORE SECOND TIER SYSTEMS

804
DETERMINE THIRD TIER SPECTRUM RESOURCES AVAILABLE FOR USE BY ONE OR MORE THIRD TIER SYSTEMS BASED ON UNUSED SECOND TIER SPECTRUM RESOURCES

MULTI-TIERED SHARED ACCESS OPERATION

CROSS-REFERENCE TO RELATED APPLICATION

This application claims the benefit under 35 U.S.C. § 119(e) to U.S. Provisional Patent Application No. 61/937,329 entitled "MULTI-TIERED SHARED ACCESS OPERATION," filed on Feb. 7, 2014, the disclosure of which is expressly incorporated by reference herein in its entirety.

FIELD

The present disclosure is directed generally to wireless communications systems. More particularly, the disclosure relates to multi-tiered shared access operation.

BACKGROUND

Wireless communication systems are widely deployed to provide various types of communication content such as voice, data, video, and the like, and deployments are likely to increase with introduction of new data oriented systems such as Long Term Evolution (LTE) systems. Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and other orthogonal frequency division multiple access (OFDMA) systems.

Generally, a wireless multiple-access communication system can simultaneously support communication for multiple wireless terminals (also known as user equipments (UEs), user terminals, or access terminals (ATs)). Each terminal communicates with one or more base stations (also known as access points (APs), EnodeBs, or eNBs) via transmissions on forward and reverse links. The forward link (also referred to as a downlink or DL) refers to the communication link from the base stations to the terminals, and the reverse link (also referred to as an uplink or UL) refers to the communication link from the terminals to the base stations. These communication links may be established via single-in-single-out, single-in-multiple out, multiple-in-single-out, or multiple-in-multiple-out (MIMO) systems.

Newer multiple access systems, for example, LTE, deliver faster data throughput than older technologies. Faster downlink rates, in turn, have sparked a greater demand for higher-bandwidth content, such as high-resolution graphics and video, for use on or with mobile devices. Therefore, demand for bandwidth on wireless communications systems continues to increase despite availability of higher data throughput over wireless interfaces, and this trend is likely to continue. However, wireless spectrum is a limited and regulated resource. Therefore, new approaches are needed in wireless communications to more fully utilize this limited resource and satisfy consumer demand.

SUMMARY

In one aspect of the present disclosure, a method for wireless communication is disclosed. The method includes receiving an indication of unused first tier spectrum resources to determine second tier spectrum resources available for use by a second tier system. The method also includes determining third tier spectrum resources available for use by a third tier system based on unused second tier spectrum resources.

Another aspect of the present disclosure is directed to an apparatus including means for receiving an indication of unused first tier spectrum resources to determine second tier spectrum resources available for use by a second tier system. The apparatus also includes means for determining third tier spectrum resources available for use by a third tier system based on unused second tier spectrum resources.

In another aspect of the present disclosure, a computer program product for wireless communications in a wireless network is disclosed. The computer program product has a non-transitory computer-readable medium with non-transitory program code recorded thereon. The program code is executed by a processor and includes program code to receive an indication of unused first tier spectrum resources to determine second tier spectrum resources available for use by a second tier system. The program code also includes program code to determine third tier spectrum resources available for use by a third tier system based on unused second tier spectrum resources.

Another aspect of the present disclosure is directed to an apparatus for wireless communication having a memory and one or more processors coupled to the memory. The processor(s) is configured to receive an indication of unused first tier spectrum resources to determine second tier spectrum resources available for use by a second tier system. The processor(s) is also configured to determine third tier spectrum resources available for use by a third tier system based on unused second tier spectrum resources.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The present disclosure may be more fully appreciated in connection with the following detailed description taken in conjunction with the accompanying drawings.

FIG. 1 illustrates details of a wireless communication system.

FIG. 2 illustrates details of a wireless communication system having multiple cells.

FIG. 3 is a block diagram showing aspects of an Authorized Shared Access (ASA) controller coupled to different wireless communication systems including one primary system and one secondary system.

FIG. 4 is a block diagram showing aspects of an ASA controller coupled to different wireless communication systems including one primary system and multiple secondary systems.

FIG. 8 is a block diagram for a method for managing resources in a multi-tiered system.

DETAILED DESCRIPTION

Figure 5:
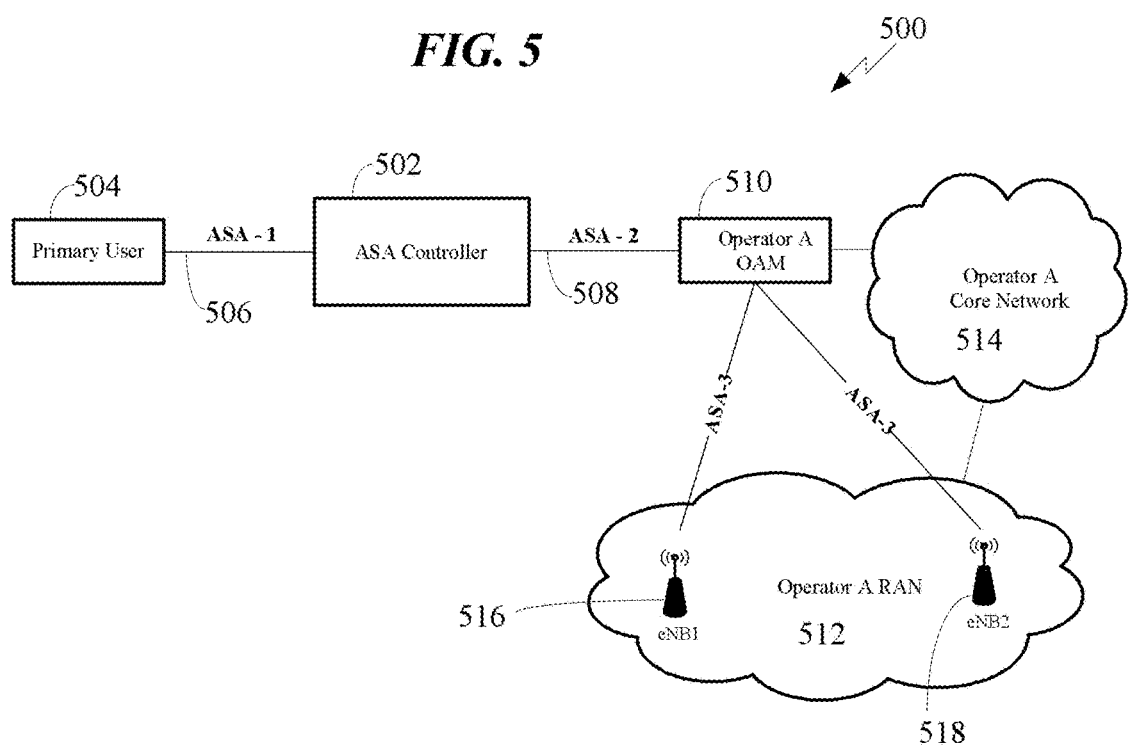
FIG. 5 is a block diagram showing aspects of an ASA controller coupled to different wireless communication systems and elements within a secondary system for supporting ASA.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). Cdma2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates details of an implementation of a multiple access wireless communication system, which may be an LTE system with authorized shared access (ASA), on which aspects as further described subsequently may be implemented. An evolved NodeB (eNB) 100 (also known as a base station, access point or AP) may include multiple antenna groups, one including 104 and 106, another including 108 and 110, and an additional including 112 and 114. In FIG. 1, only two antennas are shown for each antenna group; however, more or fewer antennas may be utilized for each antenna group. A user equipment (UE) 116 (also known as an user terminal, access terminal, or AT) is in communication with antennas 112 and 114, where antennas 112 and 114 transmit information to UE/access terminal 116 over forward link (also known as a downlink) 120 and receive information from UE 116 over reverse link (also known as an uplink) 118. A second UE 122 may be in communication with antennas 104 and 106, where antennas 104 and 106 transmit information to UE 122 over forward link 126 and receive information from access terminal 122 over reverse link 124.

In a frequency division duplex (FDD) system, communication links 118, 120, 124 and 126 may use different frequencies for communication. For example, forward link 120 may use a different frequency then that used by reverse link 118. In a time division duplex (TDD) system, downlinks and uplinks may be shared.

Each group of antennas and/or the area in which they are designed to communicate is often referred to as a sector of the eNB. That is, each antenna group is designed to communicate to UEs in a sector of the areas covered by eNB 100. In communication over forward links 120 and 126, the transmitting antennas of eNB 100 utilize beamforming in order to improve the signal-to-noise ratio of forward links for the different access terminals 116 and 122. Also, an eNB using beamforming to transmit to UEs scattered randomly through its coverage causes less interference to UEs in neighboring cells than an eNB transmitting through a single antenna to all its UEs. An eNB may be a fixed station used for communicating with the UEs and may also be referred to as an access point, a Node B, or some other equivalent terminology. A UE may also be called an access terminal, AT, user equipment, wireless communication device, terminal, or some other equivalent terminology. UEs, such as UE 116 and 122, may be further configured to operate with other nodes of other communication networks (not shown), such as, for example, GERAN and/or UTRAN networks. Moreover, base stations, such as eNB 100, may be configured to facilitate handover of served UEs to base stations of the other networks, such as through use of a redirection command.

FIG. 2 illustrates details of an implementation of a multiple access wireless communication system 200, such as an LTE system with ASA, on which aspects, such as are described subsequently, may be implemented. The multiple access wireless communication system 200 includes multiple cells, including cells 202, 204, and 206. In one aspect, the cells 202, 204, and 206 may include an eNB that includes multiple sectors. The multiple sectors can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 each correspond to a different sector. In cell 206, antenna groups 224, 226, and 228 each correspond to a different sector. The cells 202, 204, and 206 can include several wireless communication devices, e.g., user equipment or UEs, which can be in communication with one or more sectors of each cell 202, 204, or 206. For example, UEs 230 and 232 can be in communication with eNB 242, UEs 234 and 236 can be in communication with eNB 244, and UEs 238 and 240 can be in communication with eNB 246. The cells and associated base stations may be coupled to a system controller 250, which may be part of a core or backhaul network or may provide connectivity to a core or backhaul network, including, for example, an MME and SGW, such as may be used to perform functions as further described herein related to multimode coordination and operation, as well as other aspects described herein.

An operator's system may include multiple networks, which may be of multiple types (for example, in addition to the LTE network configurations shown in FIGS. 2 and 3) using different RATs. For example, one type may be an LTE system, which is data-centric. Another type may be a UTRAN system, such as a W-CDMA system. Yet another type may be a GERAN system, which may in some cases be dual transfer mode (DTM) capable (also denoted herein as a DTM GERAN). Some GERAN networks may be non-DTM capable. Multimode user terminals, such as UEs, may be configured to operate in multiple networks, such as these, as well as other (e.g., WiFi or WiMax networks, etc.).

Authorized Shared Access

Authorized shared access (ASA) is a spectrum management scheme in which portions of spectrum unused by the incumbent system(s) (sometimes referred to herein as the primary licensee) are licensed to secondary licensee(s) to provide commercial services. Such arrangements may arise when it is economically beneficial to the participants. An architecture for implementing ASA is described herein, illustrating an implementation of ASA technology but not limiting the technology to the illustrated embodiments.

The following terminology is used in the present disclosure:

ASA-1 The interface between the primary licensee and the ASA controller
ASA-2 The interface between the ASA controller and the ASA network management system
ASA-3 The interface between the ASA network manager and the ASA network elements
ASA Controller The entity that receives information from the incumbent network controller on what ASA spectrum is available for use by an ASA network and sends control information to the ASA network manager to notify it what ASA spectrum is available
ASA Network Manager An entity operated by the ASA network operator which controls and manages its network, including but not limited to the devices operating in the ASA spectrum
Secondary ASA licensee A wireless network operator that has obtained an ASA license to use ASA spectrum
Authorized Shared Access A type of spectrum licensing where ASA operators utilize portions of spectrum that are unused by the primary licensee
ASA Spectrum Spectrum that is not fully utilized by a primary licensee and has been licensed for use by an ASA operator. ASA spectrum availability is specified by location, frequency and time.
Exclusion Zone A geographic region in which an ASA network is not permitted to operate, so as to protect an incumbent system.
Primary ASA licensee A primary licensee for a band of frequencies that continues to utilize the frequency band, but does not use the entire frequency band, in all locations at all times.
Protection zone A geographic region in which the interference from secondary ASA operation is required to be below a threshold in order to protect the primary network.
Incumbent Network Controller An entity operated by the primary licensee which controls and manages its network that operates in the ASA spectrum
Geographic Sharing An ASA sharing model in which the ASA network can operate throughout a geographic region for an extended period of time. The network is not permitted to operate in regions specified by exclusion zones.

ASA Architecture

This section describes the various entities in the ASA architecture. In one aspect, an ASA architecture 300 may include an ASA controller 302 coupled to an incumbent network controller 312 of a single incumbent system and an ASA network manager 314 of a single ASA network, as show in FIG. 3. The incumbent system may be a primary ASA licensee and the ASA network may be a secondary ASA licensee.

The incumbent network controller 312 is aware of how the ASA spectrum is used by the incumbent system at specified times and locations. It provides information to the ASA controller 302 on the incumbent usage of the ASA spectrum. There are several methods that the incumbent network controller 312 can use to provide this information to the ASA controller 302. For example, the incumbent network controller 312 may specify a set of exclusion zones along with exclusion times. Another option is for the incumbent network controller 312 to specify the maximum allowed interference at a set of locations. The incumbent network controller 312 sends this incumbent protection information to the ASA controller 302 over an ASA-1 interface 316, aspects of which are described in more detail below. Incumbent protection information may be stored by the ASA controller 302 in a database 306.

The ASA controller 302 uses the information from the incumbent network controller 312 to determine what ASA spectrum can be used by the ASA network. The method used by the ASA controller 302 to determine what ASA spectrum may be used at any given time for any given location is specified in a rules database 308 accessed by an ASA processor 304. The rules database 308 stores the regulatory rules that are set by local regulations. These rules may not be modified through either the ASA-1 or the ASA-2 interfaces, and may be updated by the individual or organization that manages the ASA controller 302. What ASA spectrum is available, as calculated by the rules in the rules database 308, may be stored in the ASA spectrum availability database 310.

The ASA controller 302 may send information to the ASA network manager 314 on what ASA spectrum is available via an ASA-2 interface 318, based on the spectrum availability database. The ASA network manager 314 may know or determine the geographic location of base stations under its control and also information about the transmission characteristics of these base stations, including transmit power, supported frequencies of operation, etc. The ASA network manager 314 may query the ASA controller 302 to discover what ASA spectrum is available in a given location or a geographic region. Also, the ASA controller 302 may notify the ASA network manager 314 of any updates to the ASA spectrum availability in real-time. This allows the ASA controller 302 to notify the ASA network manager 314 if ASA spectrum is no longer available, so that the ASA network can cease using that spectrum. Thus, the incumbent network controller 312 can obtain exclusive access to the ASA spectrum in real time.

The ASA network manager 314 may be embedded in a standard network element, depending on the core network technology. For example, if the ASA network is a long term evolution (LTE) network, then the ASA network manager may be embedded in an operations, administration and maintenance (OAM) server. More information about interfaces ASA-1 and ASA-2 can be found in the discussion below.

In FIG. 3, a single incumbent network controller 312 and a single ASA network manager 314 are illustrated both connected to the ASA controller 302. It is also possible for multiple ASA networks (e.g., ASA network A, ASA network B and ASA network C) to be connected to an ASA controller 402, as in a system 400 shown in FIG. 4. ASA network A includes an ASA network A manager 414 coupled to the ASA controller 402, ASA network B includes an ASA network B manager 420 coupled to the ASA controller 402, and ASA network C includes an ASA network C manager 422 coupled to the ASA controller 402. In this case, the multiple ASA networks may share the same ASA spectrum. There are several ways in which this sharing of the ASA spectrum can be accomplished. One method is for in a given region, each network is restricted to a subband within the ASA spectrum. How each ASA network obtains rights to each subband is outside the scope of this document and must be addressed in the spectrum auctioning process. Another method for the ASA networks to share the ASA spectrum is using tight timing synchronization and using scheduling the channel access of the different networks. This ASA sharing approach has been studied for LTE networks, as an example. The system 400 may further include an incumbent network controller 412 of an incumbent system communicating with the ASA controller 402 via an ASA-1 interface 416, to provide incumbent protection information for a database 406 (similar to the database 308 in FIG. 3). The ASA controller 402 may include a processor 404 coupled to a rules database 408 (similar to the rules database 308 in FIG. 3) and ASA spectrum availability database 410 (similar to the ASA spectrum availability database 310 in FIG. 3). The ASA controller 402 may communicate with the ASA network managers 414, 420 and 422 via an ASA-2 interface 418. The incumbent system may be a primary licensee, and the ASA networks A, B, C may be secondary licensees.

The ASA network manager(s) may to interact with various network elements, such as eNBs to achieve the desired spectrum use control. This can be facilitated by the use of an ASA-3 interface as shown in FIG. 5, showing a system 500 including ASA-3 interfaces between the eNBs 516, 518 in the Radio Access Network 512 and an ASA network manager node embedded in an OAM 510. The Radio Access Network 512 may be coupled to a core network 514. An ASA controller 502 may be coupled to the OAM 510 via an ASA-2 interface 508 and to a primary user (licensee) node (e.g., incumbent network controller) 504 via an ASA-1 interface 506.

It is also possible to have multiple incumbent network controllers 504 for the same ASA spectrum. Ideally, a single incumbent network controller can provide complete information about incumbent protection for a given ASA frequency band. For that reason, the architecture may be limited to a single incumbent network controller. It is noted that multiple incumbent network controllers may be supported, but it may be more straightforward and more secure to limit to a single incumbent network controller.

The aforementioned elements of FIGS. 3-5 are not limited to an ASA architecture. Rather, the elements of FIGS. 3-5 are also contemplated for other shared access systems, such as a multi-tiered shared access system.

Multi-Tiered Shared Access

As discussed above, authorized shared access (ASA) provides temporary access to a band specified for an incumbent system or user, such as a national defense organization. In one configuration, the incumbent user transmits its time-varying resource usage to the authorized shared access system. Furthermore, in this configuration, the authorized shared access controller determines resource grants for a mobile network operator based on the shared time-varying resource usage. That is, the mobile network operator is granted access to spectrum resources available from the incumbent user. The spectrum resources that are made available by the incumbent user may be referred to as unused spectrum resources. Additionally, in the present disclosure, spectrum resources may also be referred to as resources.

Furthermore, in the present disclosure, spectrum resources may refer to spectrum usage in a given geographical area. As an example, a spectrum band F may be available in zone Y. In the present example, a portion of the band (F1) may be specified for a specific geographical area (Y1) for zone Y. Thus, in the present example, the remaining band (F-F1) may be available in all of zone Y. Furthermore, the portion of the band (F1) specified for the specific geographical area (Y1) may also be available outside of the specific geographical area (Y1).

In some cases, it may be desirable to increase the granularity for the spectrum sharing. Aspects of the present disclosure are directed to a multi-tier system, such as a three-tier system, for sharing spectrum resources. In one configuration, the spectrum resources may be resources from the 3.5 GHz band. Additionally, in one configuration, a three-tier system includes a first tier spectrum specified for incumbent systems, a second tier spectrum specified for priority access systems, such as emergency services, and a third tier spectrum specified for general access systems. The general access systems may be unlicensed systems. Furthermore, in the present disclosure, a spectrum tier may also be referred to as a tier. Although three tiers are described, the present disclosure also contemplates four or more tiers. Moreover, aspects of the present disclosure are also contemplated for users of a tier and are not limited to specific systems operating in a tier.

Figure 6:
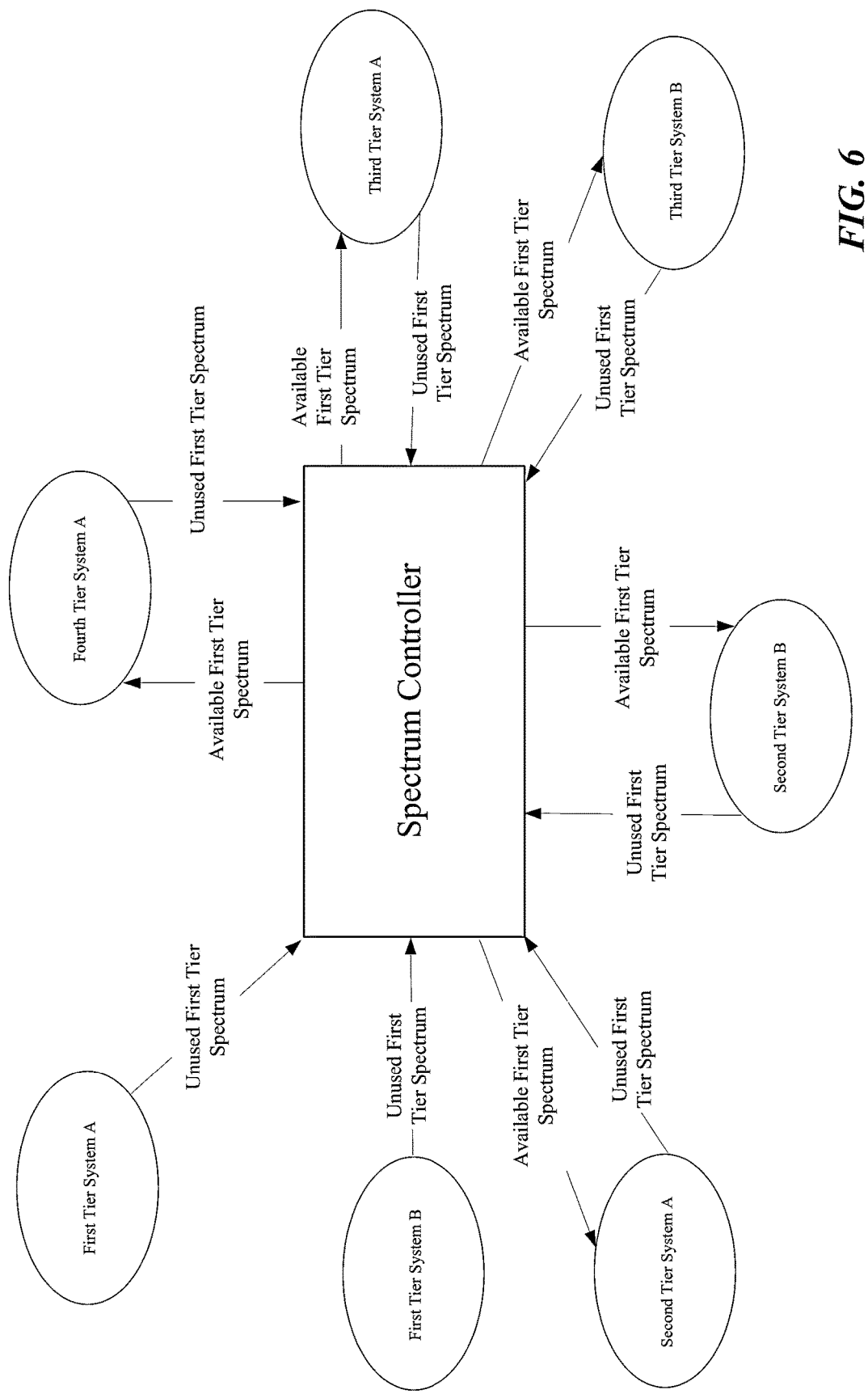
FIGS. 6 and 7 are block diagrams illustrating a multi-tiered system according to aspects of the present disclosure.

FIG. 6 is a block diagram illustrating a multi-tiered system according to an aspect of the present disclosure. As shown in FIG. 6, the multi-tiered system may have multiple tiers, such as a first tier, a second tier, a third tier, and a fourth tier. Each tier may be specified for particular systems and/or users, such as incumbent systems, general access systems, and/or priority access systems. In one configuration, a spectrum controller may receive information from a higher level tier indicating unused spectrum. The spectrum controller may then inform a lower level tier of available spectrum based on the indicated unused spectrum.

For example, as shown in FIG. 6, first tier system A and first tier system B may provide reports of their unused first tier spectrum to the spectrum controller. The spectrum controller may notify the second tier systems, such as second tier system A and second tier system B, of the available first tier spectrum. After allocating spectrum resources, for example, a portion of the available first tier spectrum, the second tier systems may report the unused first tier spectrum to the spectrum controller. That is, the second tier systems report the amount of first tier spectrum that has not been used by the second tier systems.

After the second tier systems report the unused first tier spectrum to the spectrum controller, the spectrum controller may notify third tier systems, such as third tier system A and third tier system B, of the available first tier spectrum based on the amount of first tier spectrum not used by the second tier systems and the first tier systems. Furthermore, after allocating the unused first tier spectrum, the third tier systems may report the unused first tier spectrum to the spectrum controller. The spectrum controller may then notify fourth tier systems, such as fourth tier system A, of the remaining first tier spectrum that has not been used by the first tier systems, the second tier systems, and the third tier systems.

Although aspects of the present disclosure describe each tier as being managed separately, multiple systems within a tier can be managed by one entity, while other systems can be managed by another entity. For example, a fixed boundary may be specified for the resources allocated to each system. Additionally or alternatively, aspects of the present disclosure are also contemplated for other management approaches.

Figure 7:
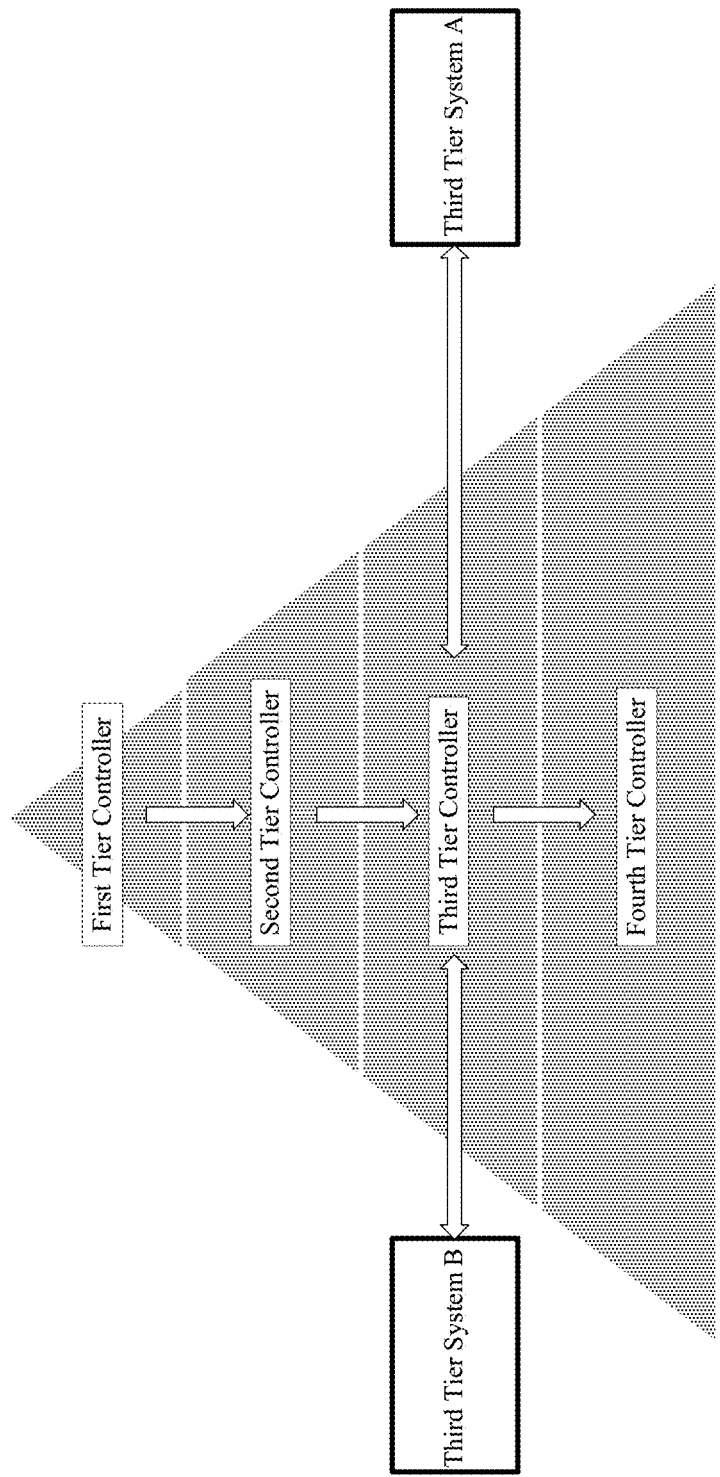

FIG. 7 illustrates a diagram of multi-tiered spectrum sharing according to an aspect of the present disclosure. As shown in FIG. 7 the multi-tiered system may have multiple tiers, such as a first tier, a second tier, a third tier, and a fourth tier. Each tier may be specified for one or more systems and/or users associated with a tier. In one configuration, a cross-tier spectrum controller (not shown in FIG. 7) may receive information from a higher level tier indicating unused spectrum. The cross-tier spectrum controller may then inform systems of a lower level tier and/or a lower level tier controller of available spectrum based on the indicated unused spectrum of a higher tier. Alternatively, or additionally, the higher level tier spectrum controller may directly inform the lower level tier spectrum controller of the available spectrum. The spectrum controller for a specific tier may be referred to as an intra-tier spectrum controller. Furthermore, in one configuration, an intra-tier controller for a specific tier may handle intra-tier allocation while the cross-tier spectrum controller may transmit and receive unused resource information amongst different tiers. In yet another configuration, an overall spectrum controller is provided that processes spectrum sharing across all tiers.

For example, as shown in FIG. 7, the unused first tier spectrum may be reported from the first tier spectrum controller to the second tier spectrum controller. That is, in the present example, based on the unused first tier spectrum, the first tier spectrum controller may notify the second tier spectrum controller of the available first tier spectrum. That is, systems of the second tier may be allocated the unused first tier spectrum. More specifically, the systems of the second tier may be allocated the spectrum previously allocated for the second tier in addition to the unused first tier spectrum. In the example of FIG. 7, each tier spectrum controller may communicate available spectrum resources to the systems and/or users of their respective tier. Furthermore, each tier spectrum controller may receive usage needs of the systems and/or users of the tier.

Moreover, after allocating the unused first tier spectrum, the systems of the second tier may report the remaining unused first tier spectrum to the second tier spectrum controller so that the second tier spectrum controller may notify the third tier spectrum controller of the available first tier spectrum based on the amount of first tier spectrum that was not used by the second tier systems and the first tier systems. The systems of a tier, such as systems A and B of the third tier, may use the allocated first tier spectrum as desired.

Alternatively, or in addition, each tier may handle contention and/or priority between systems in the same tier. For example, the third tier spectrum controller may handle contention and/or priority between third tier system A and third tier system B. That is, boundaries, such as static boundaries, may be specified to allocate resources to each system in a tier based on a management scheme or other allocation scheme. Alternatively, the tier management scheme may be a dynamic allocation, such that resources are dynamically allocated amongst the tier systems, for example based on demand, communication needs or some other criteria.

Furthermore, after allocating the unused first tier spectrum, the systems of the third tier may report the remaining unused first tier spectrum to the third tier spectrum controller. The third tier spectrum controller may notify the fourth tier spectrum controller of the available spectrum based on the amount of first tier spectrum that was not used by the third tier systems, the second tier systems, and the first tier systems.

The present example illustrate a system with four tiers, still, aspects of the present disclosure are not limited for four tiers and are contemplated for any system having three or more tiers.

In one configuration, the first tier is an incumbent tier, such that systems corresponding to the first tier have full pre-emption. That is, the first tier systems may use any of the assigned spectrum without requesting information from the spectrum controller. Still, the first tier systems are specified to announce their use of the spectrum to the spectrum controller. The spectrum controller may be referred to as the ASA system, the ASA network, or the network.

Furthermore, in one configuration, the second tier systems are informed of the available spectrum resources that are unused by the first tier systems. Furthermore, the second tier systems provide information to the spectrum controller for the available second tier resources that are unused by the second tier systems. The available second tier resources are less than or equal to the available first tier resources. The available second tier resources refer to the first tier resources that were specified as being unused by the first tier and which remain unused by the second tier.

Moreover, in the present configuration, the spectrum controller aggregates the unused spectrum of the first tier systems and the second tier systems and informs the third tier systems of the resulting available spectrum resources. The third tier systems determine the amount of spectrum to use and provide information to the spectrum controller on the available third tier resources. The available third tier resources refer to available first tier resources that were specified as being unused by the first tier systems, unused by the second tier systems, and unused by third tier systems. The available third tier resources are less than or equal to the available second tier resources. In the present application, the first tier may be referred to as tier one, the second tier may be referred to as tier two, the third tier may be referred to as tier three, and the fourth tier may be referred to as tier four.

Regardless of the number of tiers, a specific tier may aggregate multiple higher tiers such that the aggregated higher tiers are viewed as a single resource user. Therefore, the signalling between tiers may be similar to the signalling specified for an ASA network. In one configuration, the signalling of the multi-tiered network specifies the remaining resources and may not specify the systems that are using the spectrum resources.

As previously discussed, when tier N relinquishes a portion of the spectrum, the additional resources are propagated to tier N+1. Tier N+1 may have first choice as to whether to use the additional resources. The unused resources specified from tier N to tier N+1 cascade down to other tiers (N+2, N+3, etc. . . . ). Furthermore, tier N+1 may use available spectrum (unused spectrum from tier N) that was previously designated as unused by tier N+1. In this scenario, the information regarding unused tier N spectrum is dynamically updated to the lower tiers (N+2, N+3, etc. . . . ). That is, higher tiers may be able to improve service while lower tiers may have opportunistic service. More specifically, the resources allocated to a lower tier may be dynamically modified based on the resources used by higher tiers. For example, when resource usage of a higher tier system is modified, the spectrum controller may update the number of resources allocated to a lower tier system. The updating of resources may include increasing or reducing the number of allocated resources.

Furthermore, within each tier, the sharing of resources between different systems is independent of other tiers. For example, a tier may operate with an ASA licensed principle, such that a system is provided a license for exclusive use of a given share of resources when the resources are available from higher tiers. That is, there may not be a contention for resources between systems of a specific tier. Alternatively, a tier can operate with an unlicensed policy where any of the systems in the tier may access the available spectrum.

As previously discussed, in one configuration, use of the spectrum for systems of a specific tier is specified with respect and awareness of the spectrum usage of higher tiers.

As an example, the various tiers may be specified to report their given spectrum usage to the spectrum controller. In this example, an unlicensed system is made aware of available spectrum and the unlicensed system collects information on used spectrum or otherwise reserves some of the available spectrum. Furthermore, the unlicensed system may provide information on an available spectrum, such as the unused spectrum, to the spectrum controller. In this example, the unlicensed system may be an unlicensed system based on contention.

Aspects of the present disclosure provide for different configurations and may be adapted to provide a level of reservation. For example, some spectrum may be guaranteed to tier N because it includes reserved spectrum resources. Reservation may refer to hiding the spectrum and/or tier from other tiers, such as higher tiers. The reservation may be specified by a pseudo-assignment to tier one. Furthermore, portions of the spectrum may be hidden from tiers below a certain level. The spectrum may be hidden to reduce latency when all or some of the spectrum is specified for a higher tier. The latency may be reduced because the requested spectrum is not cleared by a spectrum controller. The hiding may be specified by over-declaring the usage to include specific resources even when the specific resources are unused.

In one configuration, the systems of a particular tier report to an intra-tier spectrum controller and/or a cross-tier spectrum controller resources that are available for a tier that are not currently being used. That is, a spectrum controller may determine unused spectrum resources in a specific tier based on a report that is received from systems operating in the specific tier. Alternatively, or in addition to, unused spectrum resources of a specific tier are determined based on radio measurements. For example, the available resources may be determined by a spectrum controller by measuring radio transmissions of systems in the available resource. Furthermore, the spectrum controller may identify which resources are available to the measured tier and/or other tiers. The identification of available resources may be improved by prior knowledge of particular radio characteristics for systems of each tier.

For example, different radio characteristics may be assigned to systems in each tier of a plurality of tiers. Additionally, a specific spectrum resource used by a tier may be identified based on the radio measurements of the specific spectrum resource that is using the assigned radio characteristics. The radio characteristics may include, for example, a radio access technology (RAT), carrier frequency, transmission bandwidth, and/or a specific waveform or sequence that identifies a tier.

FIG. 8 illustrates a method 800 for managing resources in a multi-tiered system. In block 802, a spectrum controller receives, from a first spectrum tier, an indication of unused first spectrum tier resources to determine second spectrum tier resources available for use by one or more second tier systems. The spectrum controller also determines third tier spectrum resources available for use by one or more third tier systems based on unused second tier spectrum resources in block 804.

Figure 9:
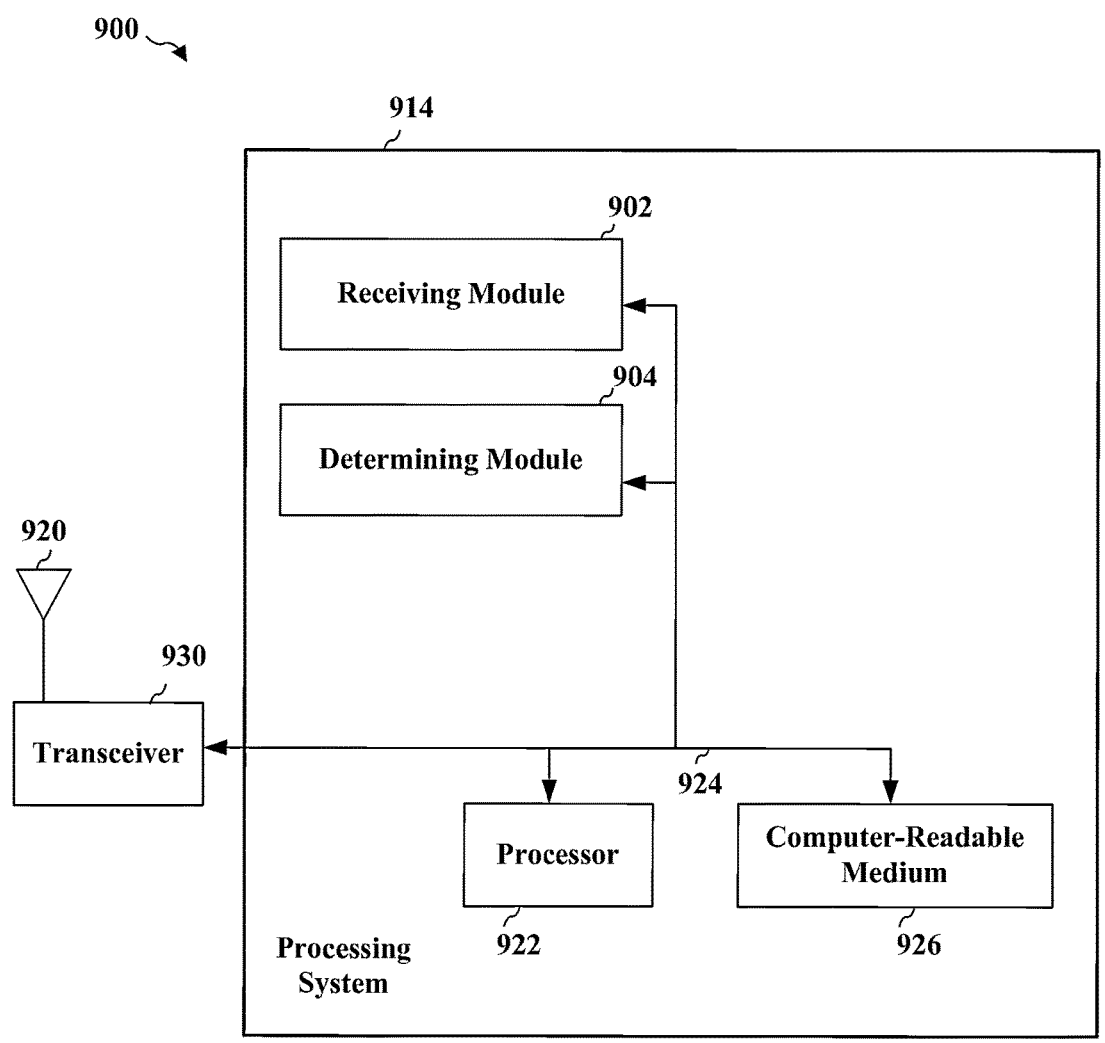
FIG. 9 is a diagram illustrating an example of a hardware implementation for an apparatus employing a spectrum processing system.

FIG. 9 is a diagram illustrating an example of a hardware implementation for an apparatus 900 employing a spectrum processing system 914. The processing system 914 may be implemented with a bus architecture, represented generally by the bus 924. The bus 924 may include any number of interconnecting buses and bridges depending on the specific application of the spectrum processing system 914 and the overall design constraints. The bus 924 links together various circuits including one or more processors and/or hardware modules, represented by the processor 922 the modules 902, 904 and the computer-readable medium 926. The bus 924 may also link various other circuits such as timing sources, peripherals, voltage regulators, and power management circuits, which are well known in the art, and therefore, will not be described any further.

The apparatus includes a spectrum processing system 914 coupled to a transceiver 930. The transceiver 930 is coupled to one or more antennas 920. The transceiver 930 enables communicating with various other apparatus over a transmission medium. The spectrum processing system 914 includes a processor 922 coupled to a computer-readable medium 926. The processor 922 is responsible for general processing, including the execution of software stored on the computer-readable medium 926. The software, when executed by the processor 922, causes the spectrum processing system 914 to perform the various functions described for any particular apparatus. The computer-readable medium 926 may also be used for storing data that is manipulated by the processor 922 when executing software.

The spectrum processing system 914 includes a receiving module 902 for receiving an indication of unused first spectrum tier resources to determine second spectrum tier resources available for use by one or more second tier systems. The spectrum processing system 914 also includes a determining module 904 for determining third tier spectrum resources available for use by one or more third tier systems based on unused second tier spectrum resources. The modules may be software modules running in the processor 922, resident/stored in the computer-readable medium 926, one or more hardware modules coupled to the processor 922, or some combination thereof. The spectrum processing system 914 may be a component of the UE and/or an eNodeB.

In one configuration, an apparatus such as a spectrum controller or a multi-tiered spectrum sharing system is configured for communication including means for receiving. In one aspect, the receiving means may be the ASA controller 302/402/502, the receiving module 902, transceiver 930, antenna 920, and/or the ASA processing system 914 configured to perform the functions recited by the receiving means. Furthermore, an apparatus such as a spectrum controller or a multi-tiered spectrum sharing system is also configured for communication including means for determining. In one aspect, the determining means may be the ASA controller 302/402/502, the determining module 904, the processor 922, and/or the spectrum processing system 914 configured to perform the functions recited by the determining means. In another aspect, the aforementioned means may be a module or any apparatus configured to perform the functions recited by the aforementioned means.

It should be noted that the aspects of the present disclosure are not limited to wireless communication. In one configuration a wired communication system is contemplated. The wired communication system may support data communication such as Internet Protocols. The spectrum controller or multi-tiered spectrum system may communicate with each tier system or user individually, and aggregates the information on their spectral usage. Moreover, the spectrum controller or multi-tiered spectrum system may communicate with an aggregator system with communication links to each system or user of a tier.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, processors may be processors, such as communication processors, specifically designed for implementing functionality in communication devices or other mobile or portable devices.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory computer-readable storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of a, b, or c" is intended to cover: a; b; c; a and b; a and c; b and c; and a, b and c. As described herein, the use of the term "and/or" is intended to represent an "inclusive OR", and the use of the term "or" is intended to represent an "exclusive OR". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for wireless communication, comprising:
    receiving, at a spectrum controller from at least one first tier system, an indication of unused first tier spectrum resources to determine second tier spectrum resources available for use by at least one second tier system;
    allocating the second tier spectrum resources to the at least one second tier system;
    receiving, at the spectrum controller from the at least one second tier system after allocating the second tier spectrum resources, an indication of unused second tier spectrum resources determined from the allocated second tier spectrum resources;
    determining, at the spectrum controller, third tier spectrum resources available for use by at least one third tier system based at least in part on the unused second tier spectrum resources; and
    allocating the third tier spectrum resources to the at least one third tier system.

2. The method of claim 1, further comprising transmitting an indication of the third tier spectrum resources available for use by the at least one third tier system to a third tier spectrum controller.

3. The method of claim 2, in which:
    a first tier spectrum is specified for incumbent systems;
    a second tier spectrum is specified for priority access systems; and
    a third tier spectrum is specified for general access systems.

4. The method of claim 2, further comprising updating an amount of available third tier spectrum resources on a modified use of at least one of first tier spectrum resources, the allocated second tier spectrum resources, or a combination thereof.

5. The method of claim 1, in which a second tier spectrum comprises reserved spectrum resources that are hidden from a first tier spectrum.

6. The method of claim 1, in which a second tier spectrum comprises reserved spectrum resources that are hidden from a third tier spectrum.

7. The method of claim 1, further comprising receiving spectrum information from the at least one second tier system to determine the second tier spectrum resources used by the at least one second tier system.

8. The method of claim 1, further comprising allocating spectrum resources between at least one of the at least one third tier system, the at least one second tier system, the at least one first tier system, or a combination thereof based at least in part on a spectrum management scheme.

9. The method of claim 8, in which spectrum resource allocation is based at least in part on boundaries of resources between systems or a dynamic allocation.

10. The method of claim 1, in which unused spectrum resources in a specific tier are determined based at least in part on reports received from systems operating in the specific tier.

11. The method of claim 1, in which unused spectrum resources of a specific tier are determined based at least in part on radio measurements.

12. The method of claim 11, in which different radio characteristics are assigned to systems in each tier, and a specific spectrum resource used by the specific tier is identified based at least in part on the radio measurements of the specific spectrum resource that is using the assigned radio characteristics.

13. The method of claim 12, in which the radio characteristics comprise at least one of a radio access technology (RAT), carrier frequency, transmission bandwidth, a specific waveform or sequence that identifies the specific tier, or a combination thereof.

14. A spectrum controller for wireless communication, the spectrum controller comprising:
a memory; and
at least one processor coupled to the memory, the at least one processor configured:
to receive, from at least one first tier system, an indication of unused first tier spectrum resources to determine second tier spectrum resources available for use by at least one second tier system;
to allocate the second tier spectrum resources to the at least one second tier system;
to receive, from the at least one second tier system after allocating the second tier spectrum resources, an indication of unused second tier spectrum resources determined from the allocated second tier spectrum resources;
to determine third tier spectrum resources available for use by at least one third tier system based at least in part on the unused second tier spectrum resources; and
to allocate the third tier spectrum resources to the at least one third tier system.

15. The spectrum controller of claim 14, in which the at least one processor is further configured to transmit an indication of the third tier spectrum resources available for use by the at least one third tier system to a third tier spectrum controller.

16. The spectrum controller of claim 15, in which:
a first tier spectrum is specified for incumbent systems;
a second tier spectrum is specified for priority access systems; and
a third tier spectrum is specified for general access systems.

17. The spectrum controller of claim 15, in which the at least one processor is further configured to update an amount of available third tier spectrum resources on a modified use of at least one of first tier spectrum resources, the allocated second tier spectrum resources, or a combination thereof.

18. The spectrum controller of claim 14, in which a second tier spectrum comprises reserved spectrum resources that are hidden from a first tier spectrum.

19. The spectrum controller of claim 14, in which a second tier spectrum comprises reserved spectrum resources that are hidden from a third tier spectrum.

20. The spectrum controller of claim 14, in which the at least one processor is further configured to receive spectrum information from the at least one second tier system to determine the second tier spectrum resources used by the at least one second tier system.

21. The spectrum controller of claim 14, in which the at least one processor is further configured to allocate spectrum resources between at least one of the at least one third tier system, the at least one second tier system, the at least one first tier system, or a combination thereof based at least in part on a spectrum management scheme.

22. The spectrum controller of claim 21, in which spectrum resource allocation is based at least in part on boundaries of resources between systems or a dynamic allocation.

23. The spectrum controller of claim 14, in which unused spectrum resources in a specific tier are determined based at least in part on reports received from systems operating in the specific tier.

24. The spectrum controller of claim 14, in which unused spectrum resources of a specific tier are determined based at least in part on radio measurements.

25. The spectrum controller of claim 24, in which different radio characteristics are assigned to systems in each tier, and a specific spectrum resource used by the specific tier is identified based at least in part on the radio measurements of the specific spectrum resource that is using the assigned radio characteristics.

26. The spectrum controller of claim 25, in which the radio characteristics comprise at least one of a radio access technology (RAT), carrier frequency, transmission bandwidth, a specific waveform or sequence that identifies the specific tier, or a combination thereof.

27. An apparatus for wireless communication, comprising:
means for receiving, at a spectrum controller from at least one first tier system, an indication of unused first tier spectrum resources to determine second tier spectrum resources available for use by at least one second tier system;
means for allocating the second tier spectrum resources to the at least one second tier system;
means for receiving, at the spectrum controller from the at least one second tier system after allocating the second tier spectrum resources, an indication of unused second tier spectrum resources determined from the allocated second tier spectrum resources;
means for determining, at the spectrum controller, third tier spectrum resources available for use by at least one third tier system based at least in part on the unused second tier spectrum resources; and
means for allocating the third tier spectrum resources to the at least one third tier system.

28. A non-transitory computer-readable medium having program code recorded thereon for wireless communications, the program code being executed by a processor and comprising:

program code to receive, at a spectrum controller from at least one first tier system, an indication of unused first tier spectrum resources to determine second tier spectrum resources available for use by at least one second tier system;

program code to allocate the second tier spectrum resources to the at least one second tier system;

program code to receive, at the spectrum controller from the at least one second tier system after allocating the second tier spectrum resources, an indication of unused second tier spectrum resources determined from the allocated second tier spectrum resources;

program code to determine, at the spectrum controller, third tier spectrum resources available for use by at least one third tier system based at least in part on the unused second tier spectrum resources; and program code to allocate the third tier spectrum resources to the at least one third tier system.

\* \* \* \* \*